(12) United States Patent
Kazama

(10) Patent No.: US 9,384,503 B2
(45) Date of Patent: Jul. 5, 2016

(54) TERMINAL APPARATUS, ADVERTISEMENT DISPLAY CONTROL APPARATUS, AND ADVERTISEMENT DISPLAY METHOD

(71) Applicant: YAHOO JAPAN CORPORATION, Tokyo (JP)

(72) Inventor: Kentaro Kazama, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 345 days.

(21) Appl. No.: 13/956,575

(22) Filed: Aug. 1, 2013

(65) Prior Publication Data

US 2014/0089110 A1 Mar. 27, 2014

(30) Foreign Application Priority Data

Sep. 24, 2012 (JP) ................................ 2012-209419

(51) Int. Cl.
*G06Q 30/00* (2012.01)
*G06Q 30/02* (2012.01)
*G06F 3/0485* (2013.01)

(52) U.S. Cl.
CPC ........ *G06Q 30/0277* (2013.01); *G06Q 30/0272* (2013.01); *G06F 3/0485* (2013.01)

(58) Field of Classification Search
CPC ....................... G06Q 30/0272; G06Q 30/0277
USPC ............ 705/14.68, 14.73; 715/784–802, 241, 715/273; 345/684, 688
See application file for complete search history.

(56) References Cited

U.S. PATENT DOCUMENTS

| | | | | |
|---|---|---|---|---|
| 5,021,989 A * | 6/1991 | Fujisawa | ........... | G06F 17/30011 345/661 |
| 6,727,930 B2 * | 4/2004 | Currans | ................ | G06F 1/1626 715/744 |
| 7,712,044 B2 * | 5/2010 | Lin-Hendel | ........... | G06F 3/0485 715/785 |
| 7,818,669 B2 * | 10/2010 | Weinlander | ........... | G06F 3/0485 715/273 |
| 8,032,298 B2 * | 10/2011 | Han | ...................... | G01C 21/367 345/660 |
| 8,103,439 B2 * | 1/2012 | Onishi | .................... | G01C 21/20 340/990 |
| 8,120,586 B2 * | 2/2012 | Hsu | ....................... | G06F 3/0485 345/173 |
| 8,205,157 B2 * | 6/2012 | Van Os | .................. | G06F 3/0488 715/702 |
| 8,239,894 B2 * | 8/2012 | Utsuki | ............... | H04N 5/44591 715/700 |
| 8,274,536 B2 * | 9/2012 | Chaudhri | ............ | G06F 3/04886 345/672 |

(Continued)

FOREIGN PATENT DOCUMENTS

| | | |
|---|---|---|
| JP | A-2000-298461 | 10/2000 |
| JP | A-2001-357291 | 12/2001 |

(Continued)

OTHER PUBLICATIONS

Office Action issued in Japanese Application No. 2012-209419 dated Jun. 3, 2014 (with translation).

*Primary Examiner* — Bennett Sigmond
(74) *Attorney, Agent, or Firm* — Oliff PLC

(57) ABSTRACT

Provided is a terminal apparatus including a display unit, an acquisition unit, a detection unit, and a display control unit. The acquisition unit acquires advertisement information from an advertisement delivery apparatus. The detection unit detects a scroll state of a page displayed on the display unit. The display control unit sets an initial display position of the advertisement information to a predetermined position of the page in a case where the page is not scrolling and which sets the initial display position of the advertisement information to a predetermined display position of the display unit in a case where the page is scrolling.

16 Claims, 9 Drawing Sheets

(56) References Cited

U.S. PATENT DOCUMENTS

| | | | | |
|---|---|---|---|---|
| 8,274,592 B2 * | 9/2012 | Watkins | G06F 3/0485 | 345/173 |
| 8,407,590 B1 * | 3/2013 | Shamis | G06F 17/30905 | 715/273 |
| 8,537,180 B1 * | 9/2013 | Grieve | G09G 5/34 | 345/173 |
| 8,624,935 B2 * | 1/2014 | Chaudhri | G06F 3/04886 | 345/672 |
| 8,635,547 B2 * | 1/2014 | Otsuka | G06F 3/0482 | 715/768 |
| 8,671,359 B2 * | 3/2014 | Koizumi | G06F 3/0485 | 345/213 |
| 8,719,029 B2 * | 5/2014 | Nonaka | G06F 17/289 | 704/258 |
| 8,793,333 B1 * | 7/2014 | Amacker | G06F 17/30554 | 345/684 |
| 8,793,573 B2 * | 7/2014 | Beckmann | G06F 17/3089 | 715/235 |
| 9,030,419 B1 * | 5/2015 | Freed | G06F 3/0416 | 345/156 |
| 9,086,791 B2 * | 7/2015 | Ishak | G06F 3/0485 | |
| 2002/0171691 A1 * | 11/2002 | Currans | G06F 1/1626 | 715/864 |
| 2003/0065563 A1 * | 4/2003 | Elliott | G06Q 20/10 | 705/14.53 |
| 2003/0151590 A1 * | 8/2003 | Pollard | G06Q 30/02 | 345/156 |
| 2003/0163372 A1 * | 8/2003 | Kolsy | G06F 17/3089 | 705/14.49 |
| 2005/0206658 A1 * | 9/2005 | Fagans | G06F 3/0481 | 345/660 |
| 2006/0005145 A1 * | 1/2006 | Weinlander | G06F 3/0485 | 715/786 |
| 2006/0020970 A1 * | 1/2006 | Utsuki | H04N 5/44591 | 725/39 |
| 2006/0235960 A1 * | 10/2006 | Lai | H04L 63/0227 | 709/224 |
| 2007/0226646 A1 * | 9/2007 | Nagiyama | G06F 3/016 | 715/784 |
| 2008/0032786 A1 * | 2/2008 | Hosokawa | G07F 17/3202 | 463/25 |
| 2008/0042984 A1 * | 2/2008 | Lim | G06F 3/0485 | 345/173 |
| 2008/0091526 A1 * | 4/2008 | Shoemaker | G06Q 20/10 | 705/14.55 |
| 2008/0243375 A1 * | 10/2008 | Han | G01C 21/367 | 701/455 |
| 2008/0288166 A1 * | 11/2008 | Onishi | G01C 21/20 | 701/533 |
| 2009/0002324 A1 * | 1/2009 | Harbeson | G06F 3/0485 | 345/173 |
| 2009/0019389 A1 * | 1/2009 | Aust | G06F 17/241 | 715/786 |
| 2009/0210810 A1 * | 8/2009 | Ryu | G06F 3/0485 | 715/769 |
| 2009/0228825 A1 * | 9/2009 | Van Os | G06F 3/0488 | 715/780 |
| 2009/0248585 A1 * | 10/2009 | Hsieh | G06Q 10/02 | 705/80 |
| 2010/0122214 A1 * | 5/2010 | Sengoku | G06F 3/0485 | 715/830 |
| 2010/0180222 A1 * | 7/2010 | Otsuka | G06F 3/0482 | 715/768 |
| 2010/0198697 A1 * | 8/2010 | Brown | G06Q 30/02 | 705/14.73 |
| 2010/0231612 A1 * | 9/2010 | Chaudhri | G06F 3/04886 | 345/684 |
| 2010/0235793 A1 * | 9/2010 | Ording | G06F 1/1626 | 715/863 |
| 2011/0074699 A1 * | 3/2011 | Marr | G06F 3/0485 | 345/173 |
| 2011/0087955 A1 * | 4/2011 | Ho | G06F 17/211 | 715/230 |
| 2011/0125594 A1 * | 5/2011 | Brown | G06Q 30/02 | 705/14.73 |
| 2011/0149138 A1 * | 6/2011 | Watkins | G06F 3/0485 | 348/333.02 |
| 2011/0225492 A1 * | 9/2011 | Boettcher | G06F 3/0485 | 715/702 |
| 2011/0252300 A1 * | 10/2011 | Lloyd | G06F 17/24 | 715/217 |
| 2011/0252362 A1 * | 10/2011 | Cho | G06F 3/0485 | 715/784 |
| 2011/0307772 A1 * | 12/2011 | Lloyd | G06F 17/2247 | 715/212 |
| 2012/0005623 A1 * | 1/2012 | Ishak | G06F 3/0485 | 715/786 |
| 2012/0032983 A1 * | 2/2012 | Nishibe | G06F 17/30905 | 345/660 |
| 2012/0072870 A1 * | 3/2012 | Akifusa | G06F 3/0482 | 715/830 |
| 2012/0272180 A1 * | 10/2012 | Larres | G06F 3/0485 | 715/784 |
| 2012/0310751 A1 * | 12/2012 | Kim | G06Q 30/02 | 705/14.72 |
| 2012/0311444 A1 * | 12/2012 | Chaudhri | G06F 3/04883 | 715/716 |
| 2012/0315977 A1 * | 12/2012 | Asami | A63F 13/10 | 463/24 |
| 2013/0006761 A1 * | 1/2013 | Warren | G06Q 30/02 | 705/14.49 |
| 2013/0080245 A1 | 3/2013 | Takami | | |
| 2013/0111330 A1 * | 5/2013 | Staikos | G06F 17/21 | 715/241 |
| 2013/0326398 A1 * | 12/2013 | Zuverink | G06F 3/048 | 715/784 |
| 2014/0089787 A1 * | 3/2014 | Takami | G06F 3/14 | 715/234 |
| 2014/0122994 A1 * | 5/2014 | Beckmann | G06F 17/30274 | 715/234 |
| 2014/0122995 A1 * | 5/2014 | Beckmann | G06F 17/3089 | 715/234 |
| 2014/0279025 A1 * | 9/2014 | Klanjsek | G06Q 30/0276 | 705/14.64 |

FOREIGN PATENT DOCUMENTS

| | | |
|---|---|---|
| JP | A-2008-287583 | 11/2008 |
| JP | A-2010-211777 | 9/2010 |
| JP | A-2011-128204 | 6/2011 |
| JP | A-2011-139521 | 7/2011 |
| WO | WO 2011/139042 A2 | 11/2011 |
| WO | WO 2011/148841 A1 | 12/2011 |

* cited by examiner

FIG.8
| SCROLL SPEED | DISPLAY SIZE | TRANSPARENCY |
|---|---|---|
| LOW SPEED | LARGE SIZE | LOW TRANSPARENCY |
| MEDIUM SPEED | MEDIUM SIZE | MEDIUM TRANSPARENCY |
| HIGH SPEED | SMALL SIZE | HIGH TRANSPARENCY |
FIG.9A
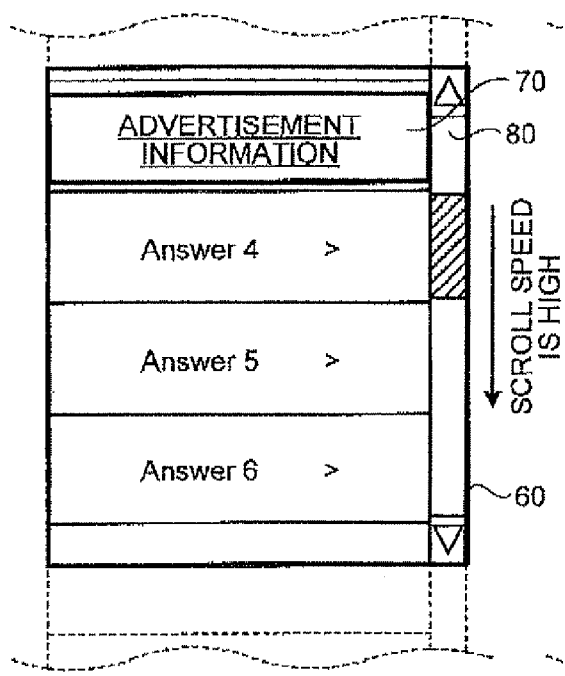
FIG.9B
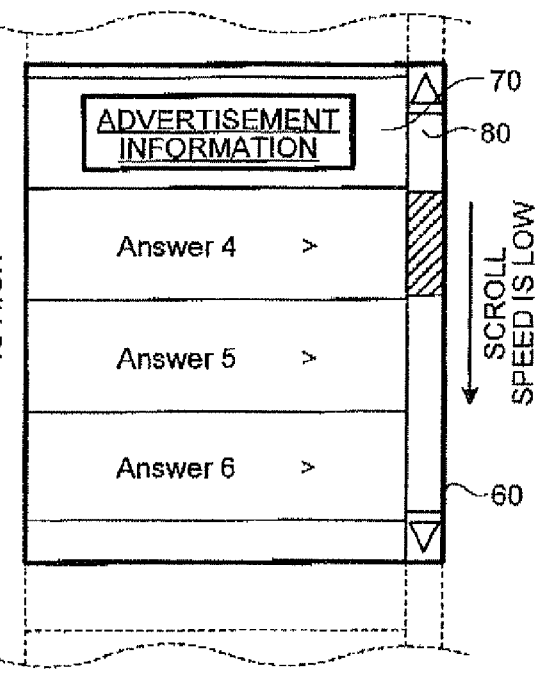

TERMINAL APPARATUS, ADVERTISEMENT DISPLAY CONTROL APPARATUS, AND ADVERTISEMENT DISPLAY METHOD

CROSS-REFERENCE TO RELATED APPLICATIONS

The present application claims priority to and incorporates by reference the entire contents of Japanese Patent Application No. 2012-209419 filed in Japan on Sep. 24, 2012.

BACKGROUND OF THE INVENTION

1. Field of the Invention

The present invention relates to a terminal apparatus, an advertisement display control apparatus, and an advertisement display method.

2. Description of the Related Art

A large amount of information has been disclosed on the Internet. In many cases, users use search sites to search for information. In the search sites, advertisement delivery called search advertising may be performed.

Such a type of advertisement delivery is performed, for example, by presenting a user with a search result page including advertisement information according to a search keyword designated by the user (for example, refer to Japanese Laid-open Patent Publication No. 2010-211777).

However, for example, since a display unit of a mobile-type terminal apparatus such as a smart phone is relatively smaller than a display unit of a general personal computer, in many cases, a search result page is not included in a display area of the display unit.

In the case of such a page, a user of the terminal apparatus views an area of the page which is not displayed on the display unit by performing scroll manipulation. Therefore, if the user performs the scroll manipulation until advertisement information constituting the page is acquired by the terminal apparatus and is displayed on the display unit, the advertisement information may not appear in the display area of the display unit, and the user may not recognize the advertisement information. This is not limited to a search result page or a mobile-type terminal apparatus. If advertisement information is set in a page which is not included in the display area of the display unit, the same problem may occur.

SUMMARY OF THE INVENTION

According to the exemplary embodiment, a terminal apparatus includes a display unit, an acquisition unit, a detection unit, and a display control unit. The acquisition unit acquires advertisement information from an advertisement delivery apparatus. The detection unit detects a scroll state of a page displayed on the display unit. The display control unit sets an initial display position of the advertisement information acquired by the acquisition unit to a predetermined position of the page in a case where the page is not scrolling and which sets the initial display position of the advertisement information acquired by the acquisition unit to a predetermined display position of the display unit in a case where the page is scrolling.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram illustrating an example of a display shape table;

FIGS. 9A and 9B are diagrams illustrating display shape according to a scroll speed;

DETAILED DESCRIPTION OF THE PREFERRED EMBODIMENTS

Hereinafter, embodiments of a terminal apparatus, an advertisement display control apparatus, an advertisement display method, and a non-transitory computer-readable storage medium according to the present invention will be described in detail with reference to the drawings. In addition, the terminal apparatus, the advertisement display control apparatus, the advertisement display method, and the non-transitory computer-readable storage medium according to the present invention are not limited by the embodiments. In addition, hereinafter, a "database" is referred to as a "DB".

1. Advertisement Display Process

Figure 1:
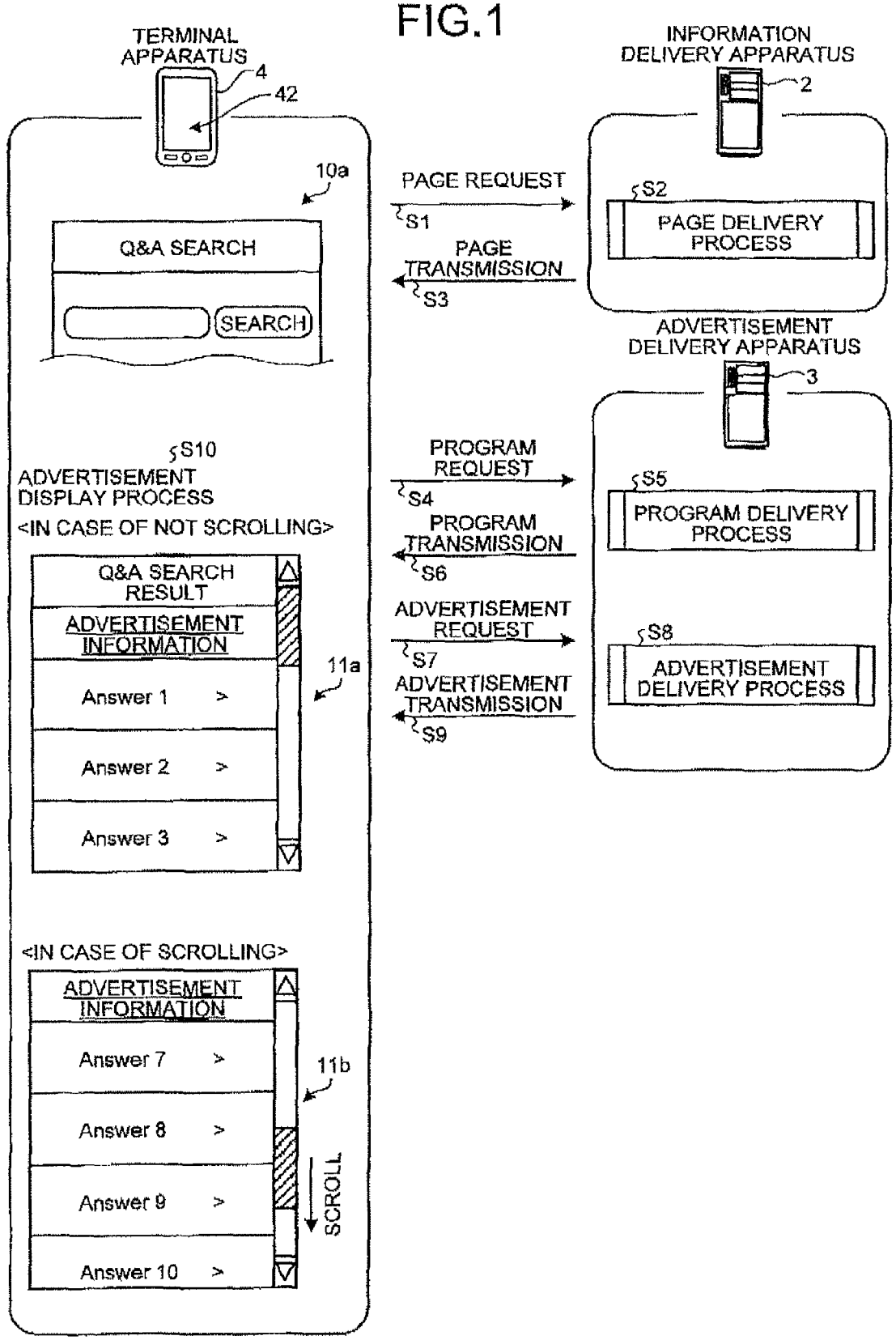
FIG. 1 is a diagram illustrating an advertisement display process according to an embodiment.

First, an advertisement display process according to an embodiment will be described. FIG. 1 is a diagram illustrating the advertisement display process according to the embodiment. An information delivery apparatus 2, an advertisement delivery apparatus 3, and a terminal apparatus 4 illustrated in FIG. 1 are connected to a communication network such as the Internet to communicate with each other through a communication network, for example, by access with designated URL (Uniform Resource Locator). Although the URL is exemplified in the description herein, information for specifying resources is not limited to the URL.

In the advertisement display process according to the embodiment, the terminal apparatus 4 acquires data of an advertisement display program from the advertisement delivery apparatus 3 (corresponding to an example of an advertisement display control apparatus). The advertisement display program is a program which is incorporated in a browser of the terminal apparatus 4 and is called an "applet". The terminal apparatus 4 displays advertisement information acquired from the advertisement delivery apparatus 3 based on the advertisement display program on a display unit 42. Hereinafter, an example of the advertisement display process will be described.

If a user of the terminal apparatus 4 inputs a search keyword in a search page 10a displayed on the display unit 42 by the browser and executes search, a page request is transmitted from the terminal apparatus 4 to the information delivery apparatus 2 (Step S1). Although a search result page (hereinafter, sometimes, simply referred to as a page) request according to a search keyword is transmitted herein, a page request with designated URL may be transmitted.

If the information delivery apparatus 2 receives the page request from the terminal apparatus 4, the information delivery apparatus 2 performs a page delivery process (Step S2). More specifically, the information delivery apparatus 2 extracts Q&A data according to the search keyword included in the page request from a Q&A database and outputs data of the search result page including the extracted Q&A data. Therefore, the data of the search result page is transmitted to the terminal apparatus 4 (step S3). In addition, the Q&A data is a set of question data and answer data.

If the terminal apparatus 4 acquires the data of the search result page from the information delivery apparatus 2, the terminal apparatus 4 executes a page display process. In the page display process, the terminal apparatus 4 displays the search result page on the display unit 42. An address of the advertisement display program is included in the data of the search result page, and the terminal apparatus 4 transmits the program request to the advertisement delivery apparatus 3 based on the URL (Step S4).

If the advertisement delivery apparatus 3 receives the program request from the terminal apparatus 4, the advertisement delivery apparatus 3 executes a program delivery process (Step S5) and delivers data of the advertisement display program according to the program request to the terminal apparatus 4 (Step S6).

In addition, the URL of the advertisement information is included in the data of the search result page, and the terminal apparatus 4 transmits an advertisement request to the advertisement delivery apparatus 3 based on the URL (Step S7). If the advertisement delivery apparatus 3 receives the advertisement request from the terminal apparatus 4, the advertisement delivery apparatus 3 executes an advertisement delivery process (Step S8) and delivers data of the advertisement information according to the advertisement request to the terminal apparatus 4 (Step S9). The advertisement information is advertisement information which is in correspondence to the search keyword included in the page request.

The advertisement display program acquired from the advertisement delivery apparatus 3 is incorporated into the browser of the terminal apparatus 4. The terminal apparatus 4 executes the advertisement display program so as to execute the advertisement display process (Step S10). In the advertisement display process, when the terminal apparatus 4 displays the advertisement information acquired from the advertisement delivery apparatus 3, the terminal apparatus 4 detects a scroll state of the search result page in the display unit 42.

In the case where the search result page is not scrolling, the terminal apparatus 4 sets an initial display position of the advertisement information acquired from the advertisement delivery apparatus 3 to a predetermined position in the search result page. Information indicating an initial display position of the advertisement information is included in the data of the search result page. In an example of a search result page 11a illustrated in FIG. 1, a front area of a page is set to an initial display position of the advertisement information, and the advertisement information is displayed in the front area of the search result page.

On the other hand, in the case where the search result page is scrolling, the terminal apparatus 4 sets the initial display position of the advertisement information acquired from the advertisement delivery apparatus 3 to a predetermined display position of the display unit 42. Namely, the terminal apparatus 4 sets the initial display position of the advertisement information by using a position in the display area of the display unit 42 as a reference rather than using a position in the search result page as a reference. Therefore, the advertisement information is displayed to be overlapped on the search result page. In an example of a search result page 11b illustrated in FIG. 2, the initial display position of the advertisement information is set in the upper area of the display area of the display unit 42.

In the case where the search result page is scrolling, if the display position of the advertisement information set in the data of the search result page is set to the initial display position of the advertisement information, the advertisement information may not be displayed on the display area of the terminal apparatus 4, so that there is a problem in that advertisement display cannot be appropriately performed. On the other hand, in the advertisement display process according to the embodiment, in the case where the search result page is scrolling, the initial display position of the advertisement information is set to the predetermined display position of the display unit 42.

In this manner, even in the case where the search result page is scrolling, since the advertisement information is located in the display area of the display unit 42, the terminal apparatus 4 can allow the user of the terminal apparatus 4 to recognize the advertisement information. Therefore, the advertisement display can be appropriately performed.

In addition, in the above description, an example where the advertisement delivery apparatus 3 as an advertisement display control apparatus provides the advertisement display program to the terminal apparatus 4 is described. However, the advertisement display program may be provided from the information delivery apparatus 2. In addition, the search result page where the advertisement display program is written in a script may be transmitted from the information delivery apparatus 2 to the terminal apparatus 4. In this case, the information delivery apparatus 2 functions as an advertisement display control apparatus.

Hereinafter, a configuration for executing the advertisement display process will be described more in detail with reference to FIGS. 2 to 13.

2. Configuration of Information Display System

Figure 2:
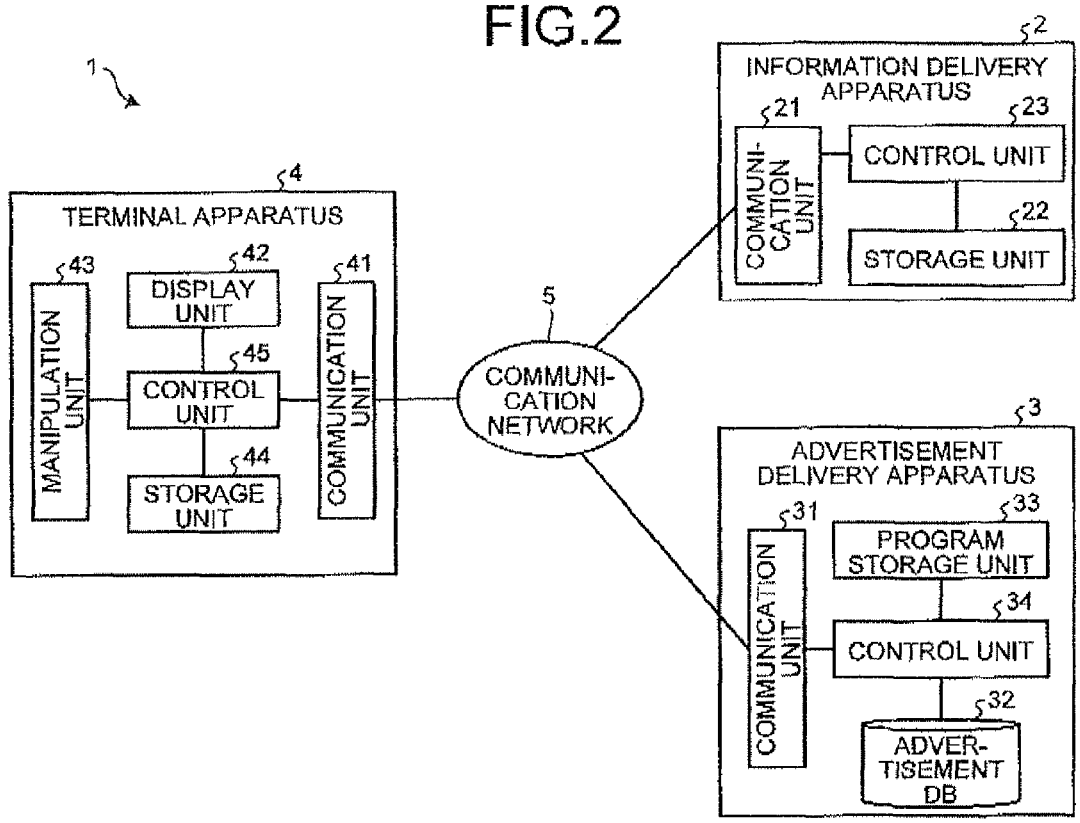
FIG. 2 is a diagram illustrating an example of a configuration of an information display system according to the embodiment.

An example of a configuration of an information display system according to the embodiment will be described with reference to FIG. 2. FIG. 2 is a diagram illustrating an example of a configuration of the information display system according to the embodiment.

As illustrated in FIG. 2, an information display system 1 according to the embodiment is configured to include the information delivery apparatus 2, the advertisement delivery apparatus 3, and the terminal apparatus 4. The information delivery apparatus 2, the advertisement delivery apparatus 3, and the terminal apparatus 4 are connected to a communication network 5 to communicate with each other through the communication network 5 by access with designated URL.

The information delivery apparatus 2 is managed, for example, by a search service provider, and the advertisement delivery apparatus 3 is managed, for example, by an advertisement delivery service provider. In addition, the advertisement delivery apparatus 3 may be configured to include the information delivery apparatus 2. In addition, the advertisement delivery apparatus 3 may be divided into an apparatus for delivering advertisement information and an apparatus for delivering an advertisement display program.

First, the information delivery apparatus 2 will be described. The information delivery apparatus 2 is configured to include a communication unit 21, a storage unit 22, and a control unit 23. The storage unit 22 includes a Q&A database. A plurality of Q&A data, that is, a set of question data and answer data are stored in the Q&A database.

If the control unit 23 receives the page request including the search keyword through the communication unit 21, the control unit 23 extracts the Q&A data including the search keyword from the storage unit 22 and transmits the data of the search result page including the extracted Q&A data to the terminal apparatus 4.

The search result page includes the URL of the advertisement information designating the advertisement information according to the search keyword included in the page request. In addition, in the case where the communication network 5 is the Internet, the search result page provided from the information delivery apparatus 2 is a web page defined in a markup language such as HTML (HyperText Markup Language).

Figure 3:
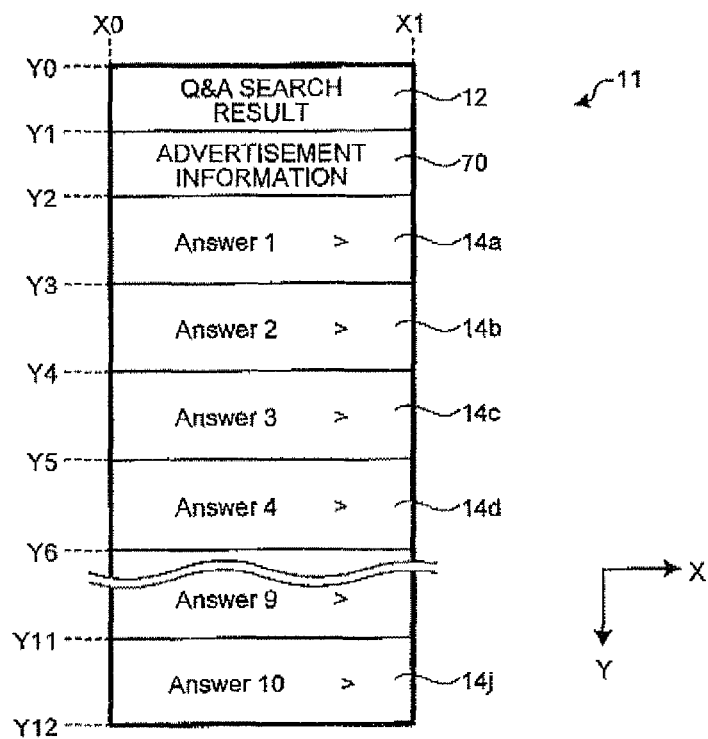
FIG. 3 is a diagram illustrating an example of a search result page delivered by an information delivery apparatus.

The search result page is configured, for example, as illustrated in FIG. 3. FIG. 3 is a diagram illustrating an example of the search result page delivered by the information delivery apparatus 2. A search result page 11 illustrated in FIG. 3 is a page of which the range in the left/right direction is X0 to X1 and of which the range in the up/down direction is Y0 to Y12.

In the search result page 11, the display position of an entry part 12 is set in the uppermost area (range of Y0 to Y1 and X0 to X1), and the display position of advertisement information 70 is set in the second upper area (range of Y1 to Y2 and X0 to X1). In addition, in the search result page 11, display positions of 10 pieces of Q&A data 14a, 14b, . . . , and 14j are set in the range of Y2 to Y12 and X0 to X1.

Information on display content and display positions of the entry part 12 and the Q&A data 14a to 14j is included in the data of the search result page 11, and in addition, information on the display position and URL of the advertisement information 70 is included in the data of the search result page 11. In addition, herein, for the simplification of the description, the search result page 11 where one piece of the advertisement information 70 is set is described as an example. However, the number of pieces or the display positions of advertisement information 70 are not limited to the example illustrated in the search result page 11.

In addition, in the above description, the search result page 11 including the Q&A data is exemplified as the information delivered from the information delivery apparatus 2. However, if a page includes information on the display position or URL of the advertisement information 70, the delivered information is not limited to the Q&A data. For example, information on a web page associated with a search keyword may be the information delivered from the information delivery apparatus 2.

Next, the advertisement delivery apparatus 3 will be described. As illustrated in FIG. 2, the advertisement delivery apparatus 3 is configured to include a communication unit 31, an advertisement DB 32, a program storage unit 33, and a control unit 34. The advertisement DB 32 stores data of a plurality of pieces of advertisement information, and in addition, the program storage unit 33 stores data of the advertisement display program.

In the case where the control unit 34 receives an advertisement request from the terminal apparatus 4, the control unit 34 extracts the data of the advertisement information designated in the advertisement request from the advertisement DB 32 and transmits the extracted data through the communication unit 31 to the terminal apparatus 4. In addition, in the case where the control unit 34 receives a program request from the terminal apparatus 4, the control unit 34 reads the data of the advertisement program from the program storage unit 33 and transmits the read data through the communication unit 31 to the terminal apparatus 4.

Next, the terminal apparatus 4 will be described. As illustrated in FIG. 2, the terminal apparatus 4 is configured to include a communication unit 41, a display unit 42, a manipulation unit 43, a storage unit 44, and a control unit 45. The communication unit 41 is a communication interface for allowing the terminal apparatus 4 to communicate with the information delivery apparatus 2 or the advertisement delivery apparatus 3 through the communication network 5. As an example of the communication unit 41, there is an interface such as a NIC (Network Interface Card).

The display unit 42 is a touch panel type display. The user of the terminal apparatus 4 can performs scroll manipulation of a page displayed on the display unit 42 by manipulating a screen of the display unit 42 with the finger or the like. In the case where the terminal apparatus 4 is a smart phone, the display unit 42 is, for example, a small-sized LCD (Liquid Crystal Display) or an organic EL display. In addition, the terminal apparatus 4 is not limited to the smart phone, but it may be, for example, a tablet type terminal or a desktop type terminal.

The manipulation unit 43 includes a keyboard including keys, in order to input characters, numbers, and space, an enter key, and arrow keys or a power button.

The storage unit 44 is a storage apparatus such as a semiconductor memory device such as a RAM (Random Access Memory) or a flash memory or a hard disk, an optical disk, or the like. The storage unit 44 stores various types of programs, setting data, or the like. As a program stored in the storage unit 44, there is, for example, an OS (Operating System) or a browser program, or the like. In addition, the storage unit 44 also stores the advertisement display program acquired from the advertisement delivery apparatus 3.

The control unit 45 is implemented by using an integrated circuit such as ASIC (Application Specific Integrated Circuit) or FPGA (Field Programmable Gate Array). In addition, the control unit 45 implements or executes functions or operations of the below-described information process, for example, by executing a program stored in the storage unit 44 by using an internal RAM (not illustrated) as a work area by a CPU (Central Processing Unit), an MPU (Micro Processing Unit), or the like.

Figure 4:
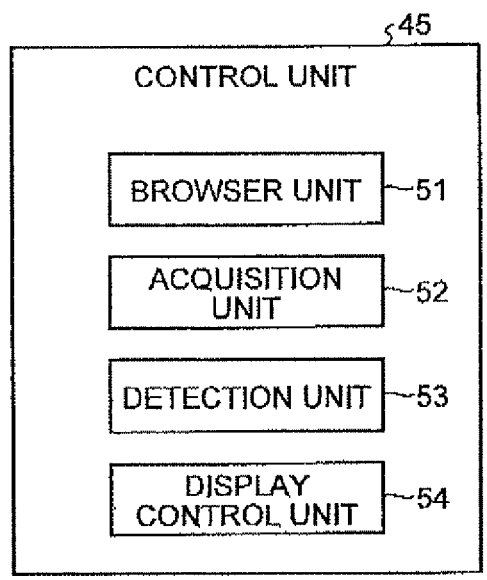
FIG. 4 is a diagram illustrating an example of a configuration of a control unit of a terminal apparatus.

The control unit 45 executes the program stored in the storage unit 44 to function as a browser unit 51, an acquisition unit 52, a detection unit 53, and a display control unit 54 as illustrated in FIG. 4. FIG. 4 is a diagram illustrating an example of a configuration of the control unit 45 of the terminal apparatus 4.

More specifically, the control unit 45 executes a browser program stored in the storage unit 44 to function as the browser unit 51. In addition, the control unit 45 executes an advertisement display program stored in the storage unit 44 to function as the acquisition unit 52, the detection unit 53, and the display control unit 54. In addition, the configuration of the control unit 45 is not limited to the above-described configuration. Any other configuration of performing the below-described information process may be used.

In addition, the acquisition unit 52 corresponds to an example of the "acquisition unit", the detection unit 53 corresponds to an example of the "detection unit", and the display control unit 54 corresponds to an example of the "display control unit".

Browser Unit 51

The browser unit 51 acquires data of a page from the information delivery apparatus 2 through the communication network 5 and displays the acquired data on the display unit 42. Information on, for example, display content, display position, display size, or the like is included in the data of the page, and the browser unit 51 generates an image of the page according to the information included in the data of the page and displays the generated image on the display unit 42.

In addition, in the case where the URL of the content such as an image is included in the data of the page, the browser unit 51 acquires the content based on the URL through the communication network 5. The browser unit 51 generates an image of the page so that the acquired content has a display position and display size defined by the data of the page.

In addition, the URL of the advertisement display program is included in the data of the page delivered from the information delivery apparatus 2, and the browser unit 51 acquires the advertisement display program based on the URL from the advertisement delivery apparatus 3 through the communication network 5 and stores the acquired advertisement display program in the storage unit 44. The control unit 45 executes the advertisement display program stored in the storage unit 44 to function as the acquisition unit 52, the detection unit 53, and the display control unit 54 as described above.

In addition, the browser unit 51 performs a scroll process for the page in the display unit 42 based on the information of scroll manipulation output from the display unit 42 or the manipulation unit 43. More specifically, the display unit 42 is a touch panel type display, and the browser unit 51 performs the scroll process for the page based on the information on scroll manipulation output from the display unit 42. In addition, the scroll manipulation may be performed by using arrow keys, or the like of the manipulation unit 43, and the browser unit 51 performs the scroll process for the page based on the information on scroll manipulation output from the manipulation unit 43.

Acquisition Unit 52

The acquisition unit 52 acquires the advertisement information from the advertisement delivery apparatus 3 through the communication network 5. The advertisement information delivered from the advertisement delivery apparatus 3 is, for example, information written in a markup language and is banner advertisement, text advertisement, or the like added with link information to a web page of an advertiser. In addition, the advertisement information acquired by the acquisition unit 52 is not limited to the information on the banner advertisement or the information on the text advertisement. For example, information on moving-picture advertisement may be used as the advertisement information.

Detection Unit 53

The detection unit 53 detects a scroll state of the page displayed on the display unit 42. As described above, the browser unit 51 performs the scroll process for the page based on the information on scroll manipulation output from the display unit 42 or the manipulation unit 43, and the detection unit 53 acquires the information on the scroll process from the browser unit 51 to detect the scroll state of the page.

In addition, the detection unit 53 may detect the scroll state of the page displayed on the display unit 42 based on the information on scroll manipulation output from the display unit 42 or the manipulation unit 43.

Display Control Unit 54

The display control unit 54 sets the display position of the advertisement information acquired by the acquisition unit 52 based on the scroll state of the page detected by the detection unit 53.

More specifically, in the case where the page is not scrolling, the display control unit 54 sets the initial display position of the advertisement information acquired by the acquisition unit 52 to a predetermined position of the page. The "predetermined position of the page" is a display position of the advertisement information defined by the data of the page delivered from the information delivery apparatus 2. For example, in the example of the search result page 11 illustrated in FIG. 3, the range of Y1 to Y2 and X0 to X1 is the "predetermined position of the page".

Figure 5:
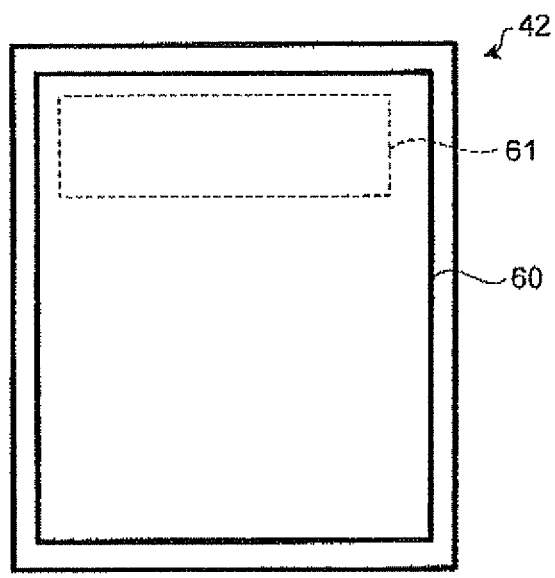
FIG. 5 is a diagram illustrating a display area of a display unit.

On the other hand, in the case where the page is scrolling, the display control unit 54 sets the initial display position of the advertisement information acquired by the acquisition unit 52 to the predetermined display position of the display unit 42 and displays the advertisement information on the display unit 42 in the state where the advertisement information is overlapped on the page. In addition, instead of overlapping the advertisement information on the page, the display control unit 54 may display the advertisement information on an area other than the page-displayed area in a display area 60 of the display unit 42. FIG. 5 is a diagram illustrating a display area of the display unit 42. As illustrated in FIG. 5, the display area 60 of the display unit 42 is formed in a rectangular shape. In the case where the page is scrolling, in the display control unit 54, for example, an area 61 illustrated in FIG. 5 is referred to as the "predetermined display position of the display unit 42".

Figure 10:
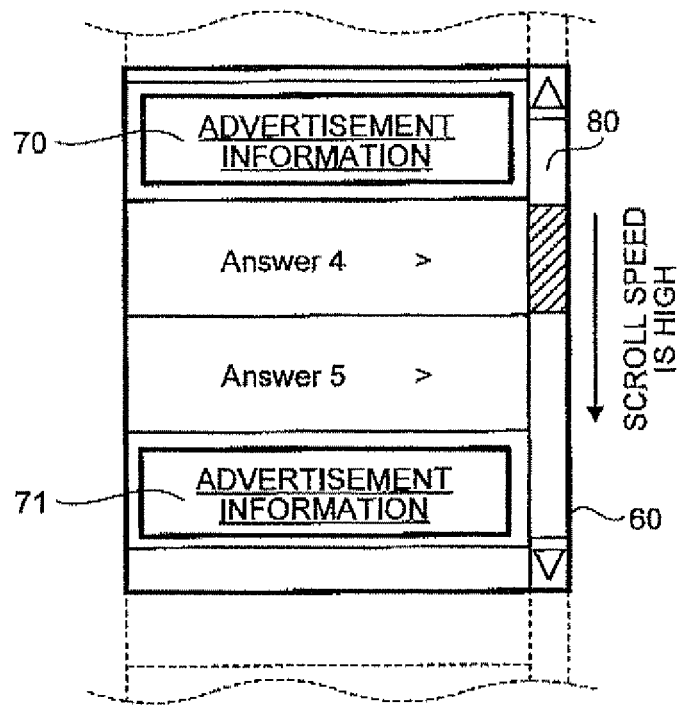

Herein, the display position of the advertisement information when the search result page 11 illustrated in FIG. 3 is displayed on the display unit 42 will be described with reference to FIGS. 6 to 10. FIGS. 6, 7, and 10 are diagrams illustrating an initial display position of the advertisement information, and FIG. 8 is a diagram illustrating an example of a display shape table included in the data of the advertisement display program. In addition, FIG. 9 is a diagram illustrating a display shape according to a scroll speed.

Figure 6A:
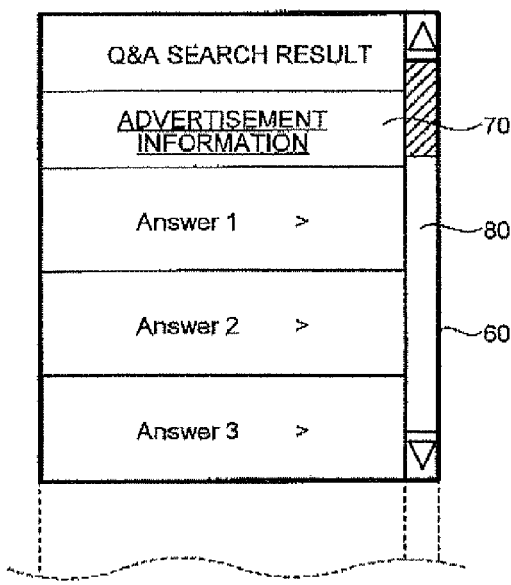
FIGS. 6A to 6D, 7, 10A and 10B are diagrams illustrating an initial display position of advertisement information.
Figure 7:
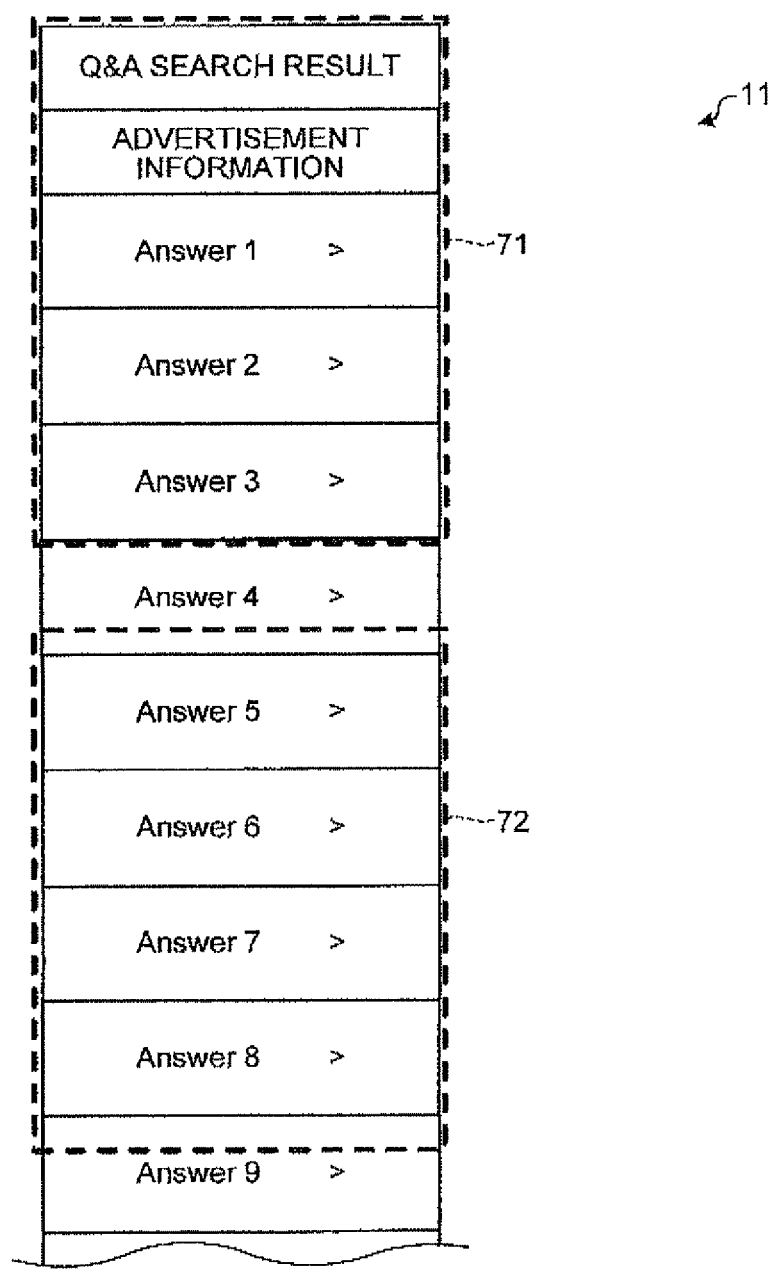

In the case where the search result page 11 is not scrolling, as illustrated in FIG. 6A, the display control unit 54 sets the display position of the advertisement information (range of Y1 to Y2 and X0 to X1 illustrated in FIG. 3) defined by the data of the search result page 11 to the initial display position of the advertisement information 70. FIG. 6A illustrates a state where an area 71 in the search result page 11 illustrated in FIG. 7 is displayed on the display unit 42. In addition, a scroll bar 80 informing the scroll position of the search result page 11 is displayed on the display area 60 of the display unit 42.

Figure 6B:
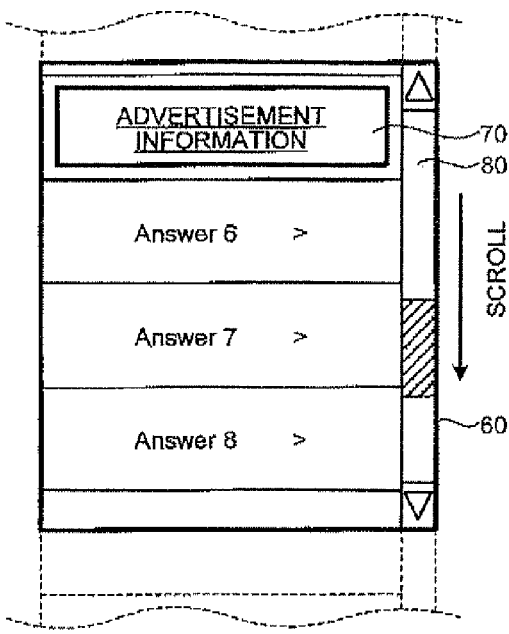

On the other hand, in the case where the search result page 11 is scrolling, as illustrated in FIG. 6B, the display control unit 54 sets the predetermined display position of the display unit 42 (area 61 illustrated in FIG. 5) to the initial display position of the advertisement information 70. FIG. 6B illustrates a state where an area 72 in the search result page 11 illustrated in FIG. 7 is displayed on the display unit 42.

In the case where the search result page 11 is scrolling, there is a case where the page setting position is outside the display area 60 of the display unit 42 at timing of displaying the advertisement information 70 at the display position of the advertisement information 70 (hereinafter, sometimes, referred to as a page setting position) defined by the data of the search result page 11.

In this case, as long as the user of the terminal apparatus 4 sets the scroll direction to the reverse direction, the page setting position is not in the display area of the display unit 42. Therefore, the display control unit 54 sets the predetermined display position of the display unit 42 (hereinafter, sometimes, referred to as a screen setting position) to the initial display position of the advertisement information 70. Accordingly, in the case where the search result page 11 is scrolling, it is possible to appropriately display the advertisement information 70.

In addition, in the case where scrolling of the search result page 11 stops after the display control unit 54 sets the initial display position of the advertisement information 70 to the screen setting position, the display control unit 54 changes the display position of the advertisement information 70 to the page setting position of the search result page 11.

Figure 6C:
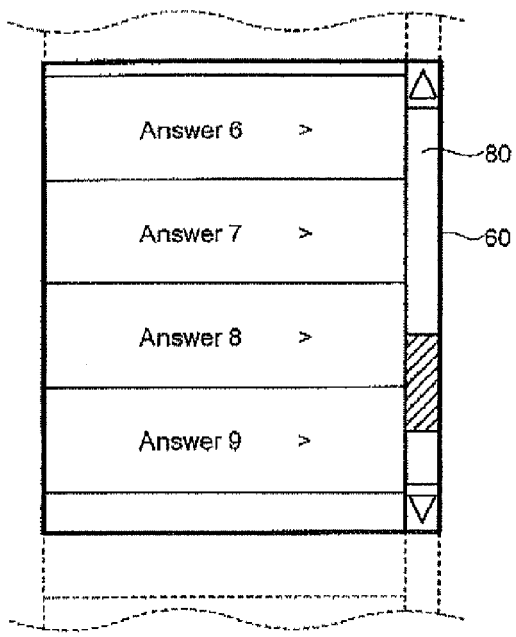

For example, as illustrated in FIG. 6B, if the scrolling stops from the scrolling state, as illustrated in FIG. 6C, the display control unit 54 changes the display position of the advertisement information 70. In the example illustrated in FIG. 6C, since the page setting position is not included in the area displayed in the display area 60 of the display unit 42 in the search result page 11, the advertisement information 70 is not displayed. In this case, the user of the terminal apparatus 4 performs scroll manipulation on the search result page 11 upward from the state illustrated in FIG. 6C to display the page setting position in the display area 60 of the display unit 42, so that the advertisement information 70 can be displayed.

Figure 6D:
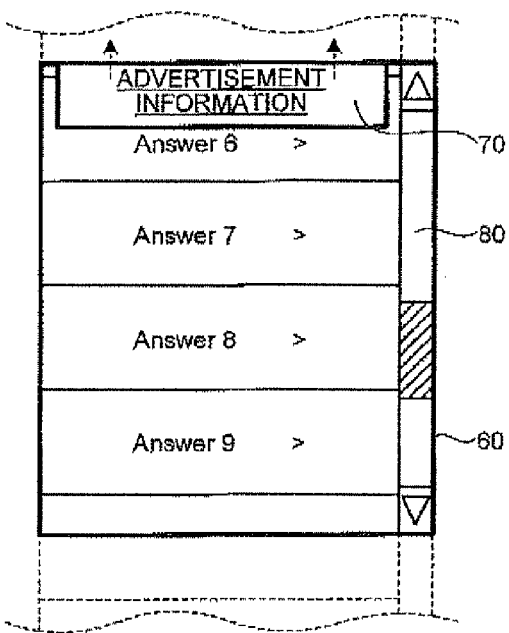

In addition, in the case where the display control unit 54 changes the display position of the advertisement information 70 from the screen setting position to the page setting position, the display control unit 54 moves the display area 60 of the display unit 42 so as to fade out the advertisement information 70. For example, in the case where the scrolling stops after the scrolling illustrated in FIG. 6B, as illustrated in FIG. 6D, the display control unit 54 moves the advertisement information 70 in the direction of the page setting position at a predetermined speed. With respect to the display position illustrated in FIG. 6D, since the page setting position is not included in the display area 60 of the display unit 42, the advertisement information 70 disappears from the display area 60 of the display unit 42, and the display area 60 of the display unit 42 is in the display state illustrated in FIG. 6C.

In this manner, in the case where the display control unit 54 changes the display position of the advertisement information 70 from the screen setting position to the page setting position, the display control unit 54 moves the advertisement information 70 to the page setting position at a predetermined speed, so that the user of the terminal apparatus 4 can easily recognize the direction of the page setting position.

In addition, in the case where the display control unit 54 changes the display position of the advertisement information 70 from the screen setting position to the page setting position, the display control unit 54 can move the advertisement information 70 while increasing transparency of the advertisement information 70. In addition, in the state where the display control unit 54 displays the advertisement information 70 at the screen setting position, the display control unit 54 may increase transparency according to elapse of time to set the transparency to 100%, so that the advertisement information 70 may be allowed to disappear from the display area 60 of the display unit 42.

In addition, in the state where the display control unit 54 displays the advertisement information 70 at the screen setting position, the display control unit 54 may reduce the size of the advertisement information 70 according to elapse of time to set the size to 0%, so that the advertisement information 70 may be allowed to disappear from the display area 60 of the display unit 42. In addition, the display control unit 54 may reduce the size of the advertisement information 70 and increase transparency according to elapse of time, so that the advertisement information 70 may be allowed to disappear from the display area 60 of the display unit 42.

In addition, even in the case where the search result page 11 is scrolling, after a predetermined display duration time elapses from the time when the display control unit 54 displays the advertisement information 70 at the screen setting position, the display control unit 54 sets the display position of the advertisement information 70 to the page setting position.

If the advertisement information 70 is displayed on the display unit 42 for a predetermined time or more, it is considered that advertising effect is obtained. On the other hand, if the advertisement information 70 continues to be displayed despite the scrolling, the user of the terminal apparatus 4 may be given an unpleasant feeling. Therefore, even in the case where the scroll state continues to be maintained, after a predetermined display duration time elapses from the time when the display control unit 54 displays the advertisement information 70 at the screen setting position, the display control unit 54 sets the display position of the advertisement information 70 to the page setting position.

The display control unit 54 adjusts the display duration time according to a scroll state of the search result page 11. For example, the display control unit 54 changes the display duration time according to a scroll speed or a scroll acceleration of the search result page 11.

In the case where the scroll speed is relatively low, the user of the terminal apparatus 4 carefully checks the Q&A data 14a to 14j of the search result page 11, so that the possibility that the user visually recognizes the advertisement information 70 is high. Therefore, in the case where the scroll speed is relatively low, the display control unit 54 sets the display duration time to be shorter than a pre-defined time.

In this case, a plurality of types of advertisement information 70 is acquired from the advertisement delivery apparatus 3, and the display control unit 54 may select the advertisement information 70 according to the scroll speed among the plurality of types of the advertisement information 70 and display the selected advertisement information 70 on the screen setting position. For example, in the case where the advertisement information 70 includes link information, the display control unit 54 selects the advertisement information 70 of which click rate is high among the plurality of types of the advertisement information 70 and displays the selected advertisement information 70. Therefore, it is possible to effectively display advertisement.

On the other hand, in the case where the scroll speed is relatively high, since the user of the terminal apparatus 4 is highly likely to skim-read the Q&A data 14a to 14j of the search result page 11, the possibility that the advertisement information 70 is visually recognized at a degree of skim reading is high. Therefore, in the case where the scroll speed is relatively high, the display control unit 54 sets the display duration time to be longer than a pre-defined time.

In addition, in the case where the scroll speed is such a relatively high as a predetermined value or more, the Q&A data 14a to 14j of the search result page 11 is not visually recognized, and the visibility of the advertisement information 70 is increased. Therefore, the display control unit 54 sets the display duration time to be shorter than a pre-defined time. In addition, even in the case where the scroll acceleration is a predetermined value or more, there is a possibility that the same state may be maintained. Therefore, the display control unit 54 sets the display duration time to be shorter than a pre-defined time.

In addition, in the case where the search result page 11 is scrolling, the display control unit 54 displays the advertisement information 70 on the screen setting position in a display shape according to the scroll speed of the search result page 11. In this case, the display control unit 54 changes at least one of, for example, color, shape, size, and transparency as the display shape. More specifically, the display control unit 54 displays the advertisement information 70 in a display shape defined in a display shape table illustrated in FIG. 8 on the screen setting position.

For example, as illustrated in FIG. 9A, in the case where the scroll speed is relatively low, the display control unit 54 allows the advertisement information 70 to be relatively large and displays the advertisement information 70 on the display unit 42. On the other hand, in the case where the scroll speed is relatively high, as illustrated in FIG. 9B, the display control unit 54 allows the advertisement information 70 to be relatively small and displays the advertisement information 70 on the display unit 42.

In this manner, the display shape of the advertisement information 70 is allowed to be changed according to the scroll speed of the search result page 11, so that it is possible to increase the interest of the user of the terminal apparatus 4 in the advertisement information 70.

In addition, in the case where the scroll speed of the search result page 11 is a predetermined threshold value or more and a plurality of pieces of the advertisement information is acquired by the acquisition unit 52, the display control unit 54 simultaneously displays the plurality of pieces of the advertisement information at the screen setting position.

For example, a plurality of pieces of advertisement information 70 and 71 are acquired by the acquisition unit 52, and in the case where the scroll speed of the search result page 11 is relatively high, as illustrated in FIG. 10, the plurality of pieces of the advertisement information 70 and 71 are simultaneously displayed at the screen setting position. In this case, the number of screen setting positions is set according to the number of pieces of advertisement information.

In addition, in the case where the scroll speed of the search result page 11 is less than a predetermined threshold value and a plurality of pieces of advertisement information is acquired by the acquisition unit 52, the display control unit 54 sequentially displays the plurality of pieces of the advertisement information on the screen setting position. In this case, for example, one screen setting positions is used, and the plurality of pieces of the advertisement information is sequentially displayed at the screen setting position.

3. Flow of Process of Terminal Apparatus

Figure 11:
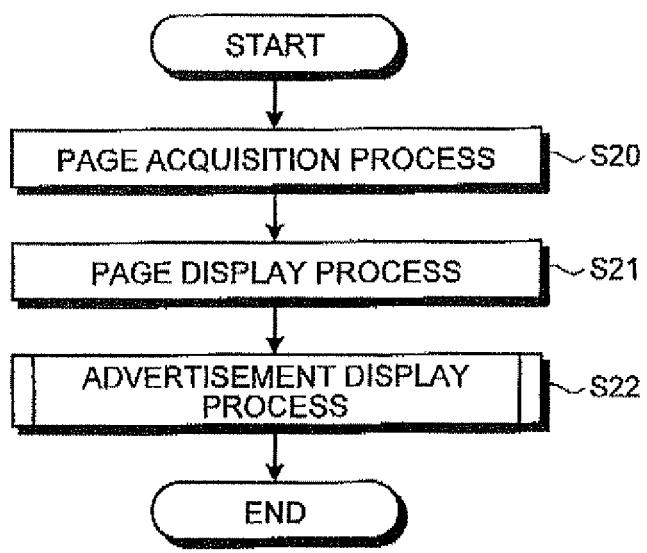
FIG. 11 is a flowchart illustrating a page display process by a terminal apparatus according to the embodiment.

Next, a procedure of an advertisement display process by the terminal apparatus 4 according to the embodiment will be described. FIG. 11 is a flowchart illustrating a page display process by the terminal apparatus 4 according to the embodiment.

As illustrated in FIG. 11, the control unit 45 performs a page acquisition process for acquiring the data of the page from the information delivery apparatus 2 through the communication unit 41 (Step S20). The page acquisition process is a process performed by the browser unit 51. For example, the browser unit 51 acquires the search result page 11 illustrated in FIG. 3 from the information delivery apparatus 2.

Next, the control unit 45 performs a page display process for displaying the page acquired by the information delivery apparatus 2 on the display unit 42 (Step S21). The page display process is a process performed by the browser unit 51. For example, the browser unit 51 displays the search result page 11 on the display unit 42 according to the data of the search result page 11 illustrated in FIG. 3.

In addition, when the control unit 45 displays the page acquired from the information delivery apparatus 2 on the display unit 42, the control unit 45 performs an advertisement display process of acquiring the advertisement information designated by the data of the page from the advertisement delivery apparatus 3 and displaying the acquired advertisement information on the display unit 42 (Step S22). Therefore, the information of the page including the advertisement information is displayed on the display unit 42.

Figure 12:
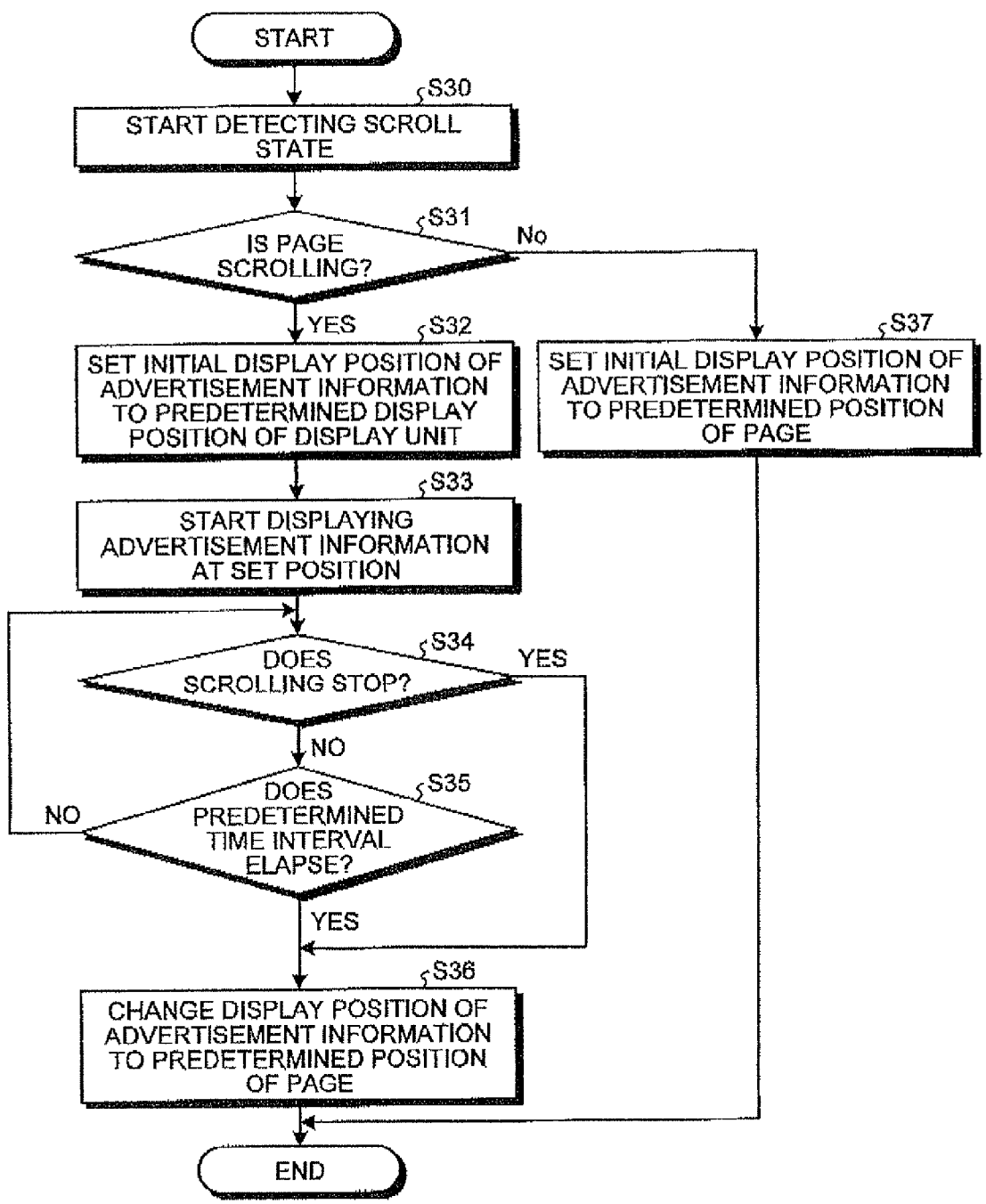
FIG. 12 is a flowchart illustrating an advertisement display process illustrated in FIG. 11.

Now, the advertisement display process illustrated in Step S22 will be described in detail. FIG. 12 is a flowchart illustrating the advertisement display process illustrated FIG. 11.

As illustrated in FIG. 12, if the control unit 45 of the terminal apparatus 4 starts the advertisement display process, the control unit 45 starts detecting the scroll state (Step S30). Next, it is determined whether or not the page displayed on the display unit 42 is scrolling (Step S31).

If it is determined that the page is scrolling (Yes in Step S31), the control unit 45 sets the initial display position of the advertisement information to a predetermined display position (screen setting position) of the display unit 42 (Step S32). For example, the control unit 45 sets the area 61 of the display unit 42 illustrated in FIG. 5 to the predetermined display position.

Next, the control unit 45 displays the advertisement information at the position set in Step S32 (Step S33). For example, in a case where the position set in step S32 is the area 61 of the display unit 42 illustrated in FIG. 5, as illustrated in FIG. 6B, the control unit 45 displays the advertisement information 70. In addition, as described above, the control unit 45 changes the display shape of the advertisement information, for example, according to the scroll speed or the scroll acceleration.

After the control unit 45 starts displaying the advertisement information, the control unit 45 determines whether or not scrolling stops (Step S34). In the process, if it is determined that scrolling stops (Yes in Step S34), the control unit 45 allows the process to proceed to Step S36.

On the other hand, if it is determined that scrolling does not stop (No in Step S34), the control unit 45 displays the advertisement information on the display unit 42, and then the control unit 45 determines whether or not a predetermined time interval elapses (Step S35). In the process, if it is determined that a predetermined time interval does not elapse (No in Step S35), the control unit 45 allows the process to return to Step S34.

On the other hand, if it is determined that a predetermined time interval elapses (Yes in Step S35), the control unit 45 allows the process to proceed to Step S36. In Step S36, the control unit 45 changes the display position of the advertisement information to a predetermined position (page setting position) of the page and ends the advertisement display process.

In addition, in Step S31, if the page is determined not to be scrolling (No in Step S31), the control unit 45 sets the initial display position of the advertisement information to a predetermined position (page setting position) of the page (Step S37) and ends the advertisement display process.

Figure 13:
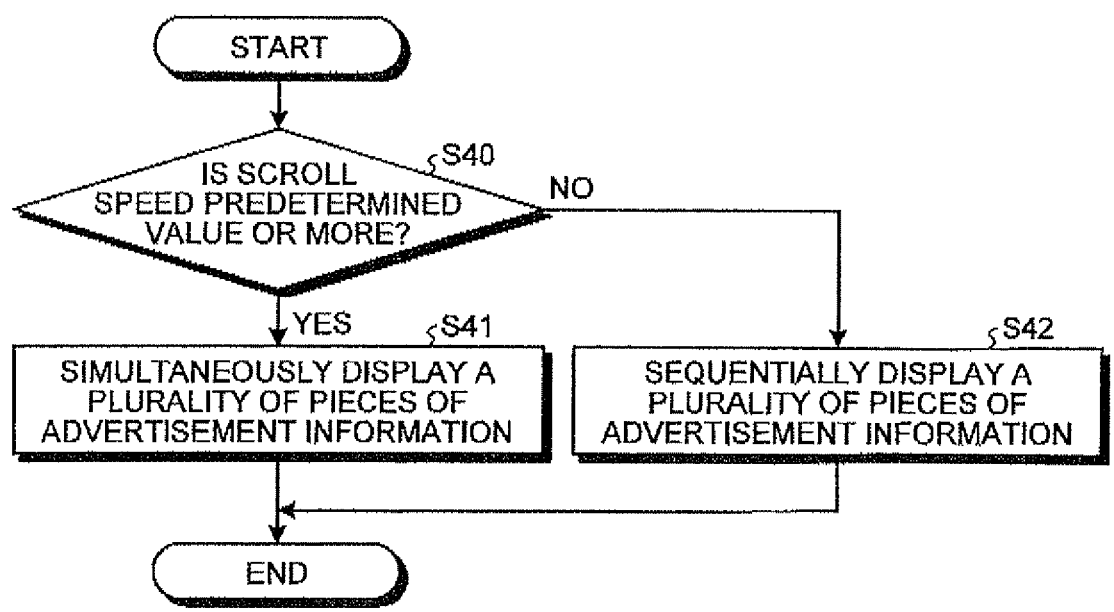
FIG. 13 is a flowchart illustrating a display process for the advertisement information illustrated in FIG. 12.

Now, a process in a case where there is a plurality of pieces of advertisement information to be displayed in step S33 will be described. FIG. 13 is a flowchart illustrating a display process of the advertisement information illustrated in FIG. 12.

As illustrated in FIG. 13, in a case where there is a plurality of pieces of the advertisement information, the control unit 45 determines whether or not the scroll speed is a predetermined value or more (Step S40). In the process, if it is determined that the scroll speed is a predetermined value or more (Yes in Step S40), the control unit 45 simultaneously displays a plurality of pieces of the advertisement information acquired from the advertisement delivery apparatus 3 at a predetermined display position of the display unit 42 (Step S41).

For example, in a case where there are two pieces of the advertisement information 70 and 71 as a plurality of pieces of the advertisement information, as illustrated in FIG. 10, the control unit 45 sets upper and lower areas in the display area 60 of the display unit 42 as predetermined display areas and displays the pieces of advertisement information 70 and 71 on the upper and lower areas, respectively.

On the other hand, if it is determined that the scroll speed is not a predetermined value or more (No in Step S40), the control unit 45 sequentially displays a plurality of pieces of the advertisement information acquired from the advertisement delivery apparatus 3 at a predetermined display position of the display unit 42 (Step S42). In addition, the control unit 45 may display a plurality of pieces of the advertisement information at the same predetermined display position. In addition, the control unit 45 may sequentially display a plurality of pieces of the advertisement information at different predetermined display positions.

4. Modified Example

In the above-described embodiment, the upper area of the page is exemplified as the display position (page setting position) of the advertisement information of the page delivered from the information delivery apparatus 2 in the description. However, the display position is not limited to the above-described position.

For example, the page setting position may be in the central area of the page or in the lower area of the page. Even in a case where the page setting position is set to any area, in the case where the page is scrolling, the display control unit 54 may set the initial display position of the advertisement information to the screen setting position. For example, in the case where the page is scrolling at the timing when the acquisition unit 52 acquires the advertisement information, the display control unit 54 sets the initial display position of the advertisement information to the screen setting position. In addition, in a case where the page setting position has been passed through or is passing though the display area 60 of the display unit 42 by the scroll of the previous page at the time when the acquisition unit 52 acquires the advertisement information, the display control unit 54 may set the initial display position of the advertisement information to the screen setting position.

In addition, the page setting positions may be set to a plurality of the areas. In this case, the display control unit 54 performs the above-described advertisement display control on the advertisement information corresponding to the page setting positions. In addition, the display control unit 54 may perform different advertisement display controls on the advertisement information according to the page setting positions.

In addition, in the above-described embodiment, the advertisement display program is configured with applets or scripts. However, dedicated application where the advertisement display program is embedded in the browser or the like may be used. In this case, the terminal apparatus 4 executes the dedicated application to acquire the data of the page from the information delivery apparatus 2 and displays the advertisement information acquired from the advertisement delivery apparatus 3.

In addition, in the above-described embodiment, the page setting position is described to be fixed. However, the display control unit 54 allows the page setting position to be vibrated according to, for example, the scroll speed or the scroll acceleration. By doing so, it is possible to increase the possibility that the user of the terminal apparatus 4 visually recognizes the advertisement information.

In addition, in the above-described embodiment, the acquisition unit 52 acquires the advertisement information designated by the data of the page from the advertisement delivery apparatus 3. However, the acquisition unit 52 may acquire the advertisement information, for example, according to the scroll speed or the scroll acceleration from the advertisement delivery apparatus 3. By doing so, it is possible to display the advertisement information according to the scroll speed or the scroll acceleration.

In addition, in the above-described embodiment, the search advertising of displaying the advertisement information according to the search keyword on the page is described. However, if the advertisement information 70 is set in a page and the page is not in the display area 60 of the display unit 42, the page is not limited to the search result page 11. In addition, the terminal apparatus 4 is not limited to the mobile-type terminal apparatus. If the page can be scrolled in a terminal apparatus, a personal computer may be used as the terminal apparatus.

In addition, the above-described information delivery apparatus 2 or the above-described advertisement delivery apparatus 3 may be implemented by using a plurality of server computers. In addition, according to functions, an external platform or the like may be called through API (Application Programming Interface), network computing, or the like to implement the above-described information delivery apparatus 2 or the above-described advertisement delivery apparatus 3, so that the configuration thereof can be adaptively changed.

5. Effect

As described above, the advertisement delivery apparatus 3 according to the embodiment is configured to include the control unit 34 (an example of a program delivery unit) which delivers the data of the advertisement display program to the terminal apparatus 4 including the display unit 42. The advertisement display program allows the terminal apparatus 4 to function as: an acquisition unit 52 (an example of an acquisition unit) which acquires the advertisement information from the advertisement delivery apparatus 3; a detection unit 53 (an example of a detection unit) which detects the scroll state of the page displayed on the display unit 42; and a display control unit 54 (an example of a display control unit) which sets the initial display position of the advertisement information acquired by the acquisition unit 52 to the page setting position (an example of the predetermined position of the page) in a case where the page is not scrolling and which sets the initial display position of the advertisement information acquired by the acquisition unit 52 to the screen setting position (an example of the predetermined display position of the display unit 42) in the case where the page is scrolling.

Therefore, even in a case where scroll manipulation is performed while the page such as a search result page is displayed on the display unit 42, the advertisement information can be displayed on the screen of the display unit 42 according to the scroll state, so that it is possible to appropriately perform the advertisement display. Particularly, in a case where the terminal apparatus 4 is a mobile terminal, since the display area 60 of the display unit 42 is relatively small, the user of the terminal apparatus 4 may frequently perform the scroll manipulation. Even in this case, it is possible to appropriately perform the advertisement display.

In addition, in a case where the scrolling of the page stops after the display control unit 54 sets the initial display position of the advertisement information to the screen setting position, the display control unit 54 changes the display position of the advertisement information to the page setting position.

Therefore, in a case where the scrolling stops, the advertisement information is set to be displayed at the display position set in the page, so that it is possible to reduce process load of the overlap process or the like.

In addition, in a case where the display control unit 54 changes the display position of the advertisement information from the screen setting position to the page setting position, after the display control unit 54 moves the display position of the advertisement information in the display unit 42 from the screen setting position in a predetermined direction, the display control unit 54 changes the display position of the advertisement information to the page setting position.

Therefore, since the advertisement information is allowed to fade out from the display area 60, the unpleasant feeling given to the user of the terminal apparatus 4 can be reduced in comparison with the case where the advertisement information suddenly disappears from the display area 60.

In addition, even in the case where the page is scrolling, after a predetermined time elapses from the time when the display control unit 54 displays the advertisement information at the screen setting position, the display control unit 54 sets the display position of the advertisement information to the page setting position.

Therefore, after advertising effect is obtained by displaying the advertisement information for a predetermined time, the display position of the advertisement information is set to be displayed to the page setting position, so that the problem in that too much advertisement information is displayed can be avoided and the unpleasant feeling given to the user of the terminal apparatus 4 can be reduced.

In addition, the display control unit 54 changes the predetermined time according to the scroll speed of the page.

Therefore, it is possible to adjust a degree of exposure of the advertisement information according to the scroll speed of the page. For example, in a case where the scroll speed is high, since there is a possibility that the user is skim-reading the page and is not closely watching the advertisement, advertising effect can be obtained, for example, by increasing the advertisement display time.

In addition, in the case where the page is scrolling, the display control unit 54 displays the advertisement information at the screen setting position in a display shape according to the scroll speed of the page.

Since the interest of the user of the terminal apparatus 4 in the advertisement information is different between the cases where the scroll speed is high and low, the display shape is changed corresponding to the interest of the user of the terminal apparatus 4, so that it is possible to effectively obtain advertising effect.

In addition, in a case where the scroll speed of the page is a predetermined threshold value or more and a plurality of pieces of the advertisement information is acquired by the acquisition unit 52, the display control unit 54 simultaneously displays a plurality of pieces of the advertisement information at the screen setting position.

In a case where the scroll speed is high, since the user is skim-reading the page and is not closely watching the advertisement, a plurality of pieces of the advertisement information are displayed at one time, so that the user's interest in the advertisement information can be increased.

In addition, in a case where the scroll speed of the page is less than a predetermined threshold value and a plurality of pieces of the advertisement information is acquired by the acquisition unit 52, the display control unit 54 sequentially displays a plurality of pieces of the advertisement information at the screen setting position.

In a case where the scroll speed is low, since the possibility that the user carefully checks the content of the page and visually recognizes the advertisement information is high, the advertisement information is sequentially switched to be displayed, so that it is possible to allow advertisement information to be effectively recognized.

According to an aspect of the embodiment, it is possible to provide a terminal apparatus, an advertisement display control apparatus, an advertisement display method, and a non-transitory computer-readable storage medium capable of obtaining an advantage in that advertisement display can be appropriately performed in the case where a page is scrolling.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal apparatus comprising:
   a physical display unit;
   an acquisition unit which acquires advertisement information from an advertisement delivery apparatus;
   a detection unit which detects a scroll state of a page displayed on the physical display unit; and
   a display control unit which:
      when the page is not scrolling, sets an initial display position of the advertisement information acquired by the acquisition unit to a predetermined position of the page such that, if the predetermined position of the page is not included in a display area of the physical display unit, the advertisement information is not displayed;
      when the page is scrolling, sets the initial display position of the advertisement information acquired by the acquisition unit to a display position of the physical display unit that is predetermined; and
      when scrolling of the page stops after the initial display position of the advertisement information has been set to the predetermined display position of the physical display unit, changes a display position of the advertisement information to the predetermined position of the page.

2. The terminal apparatus according to claim 1, wherein, when the display control unit changes the display position of the advertisement information from the predetermined display position of the physical display unit to the predetermined position of the page, the display control unit moves the display position of the advertisement information in the physical display unit from the predetermined display position in a predetermined direction, and after that, changes the display position of the advertisement information to the predetermined position of the page.

3. The terminal apparatus according to claim 1, wherein, even when the page is scrolling, after a predetermined time elapses from the time when the display control unit displays the advertisement information at the predetermined display position of the physical display unit, the display control unit sets the display position of the advertisement information to the predetermined position of the page.

4. The terminal apparatus according to claim 3, wherein the display control unit changes the predetermined time according to a scroll speed of the page.

5. The terminal apparatus according to claim 1, wherein, when the page is scrolling, the display control unit displays the advertisement information at the predetermined display position of the physical display unit in a display shape according to the scroll speed of the page.

6. The terminal apparatus according to claim 1, wherein, when the scroll speed of the page is a predetermined threshold value or more and a plurality of pieces of the advertisement information are acquired by the acquisition unit, the display control unit simultaneously displays the plurality of pieces of the advertisement information at the predetermined display position of the physical display unit.

7. A terminal apparatus comprising:
a physical display unit;
an acquisition unit which acquires advertisement information from an advertisement delivery apparatus;
a detection unit which detects a scroll state of a page displayed on the physical display unit; and
a display control unit which:
when the page is not scrolling, sets an initial display position of the advertisement information acquired by the acquisition unit to a predetermined position of the page;
when the page is scrolling, sets the initial display position of the advertisement information acquired by the acquisition unit to a display position of the physical display unit that is predetermined; and
when a scroll speed of the page is less than a predetermined threshold value and a plurality of pieces of the advertisement information are acquired by the acquisition unit, sequentially displays the plurality of pieces of the advertisement information at the predetermined display position of the physical display unit.

8. An advertisement display system comprising:
a terminal apparatus including a physical display unit; and
a control apparatus comprising a program delivery unit which delivers data of an advertisement display program to the terminal apparatus, wherein the advertisement display program causes the terminal apparatus to function as:
an acquisition unit which acquires advertisement information from an advertisement delivery apparatus;
a detection unit which detects a scroll state of a page displayed on the physical display unit; and
a display control unit which:
when the page is not scrolling, sets an initial display position of the advertisement information acquired by the acquisition unit to a predetermined position of the page such that, if the predetermined position of the page is not included in a display area of the physical display unit, the advertisement information is not displayed;
when the page is scrolling, sets the initial display position of the advertisement information acquired by the acquisition unit to a display position of the display unit that is predetermined; and
when scrolling of the page stops after the initial display position of the advertisement information has been set to the predetermined display position of the physical display unit, changes a display position of the advertisement information to the predetermined position of the page.

9. An advertisement display method executed by a computer, the method comprising:
acquiring advertisement information from an advertisement delivery apparatus;
detecting a scroll state of a page displayed on a physical display unit;
when the page is not scrolling, setting an initial display position of the advertisement information, which is acquired in the acquiring of the advertisement information from the advertisement delivery apparatus, to a predetermined position of the page such that, if the predetermined position of the page is not included in a display area of the physical display unit, the advertisement information is not displayed;
when the page is scrolling, setting the initial display position of the advertisement information to a display position of the physical display unit that is predetermined; and
when scrolling of the page stops after the initial display position of the advertisement information has been set to the predetermined display position of the physical display unit, changing a display position of the advertisement information to the predetermined position of the page.

10. The advertisement display method according to claim 9, further comprising: changing the display position of the advertisement information from the predetermined display position of the physical display unit to the predetermined position of the page after moving the display position of the advertisement information in the physical display unit from the predetermined display position in a predetermined direction.

11. The advertisement display method according to claim 9, further comprising: setting the display position of the advertisement information to the predetermined position of the page, even when the page is scrolling, after a predetermined time elapses from the time when the display control unit displays the advertisement information at the predetermined display position of the physical display unit.

12. The advertisement display method according to claim 11, further comprising: changing the predetermined time according to a scroll speed of the page.

13. The advertisement display method according to claim 9, further comprising: displaying the advertisement information at the predetermined display position of the physical display unit in a display shape according to the scroll speed of the page.

14. The advertisement display method according to claim 9, further comprising: displaying simultaneously a plurality of pieces of the advertisement information at the predetermined display position of the physical display unit, when the scroll speed of the page is a predetermined threshold value or more and the plurality of pieces of the advertisement information are acquired.

15. An advertisement display method executed by a computer, the method comprising:
acquiring advertisement information from an advertisement delivery apparatus;
detecting a scroll state of a page displayed on a physical display unit;
when the page is not scrolling, setting an initial display position of the advertisement information, which is acquired in the acquiring of the advertisement information from the advertisement delivery apparatus, to a predetermined position of the page;
when the page is scrolling, setting the initial display position of the advertisement information to a display position of the physical display unit that is predetermined; and
when a scroll speed of the page is less than a predetermined threshold value and a plurality of pieces of the advertisement information are acquired, displaying sequentially the plurality of pieces of the advertisement information at the predetermined display position of the physical display unit.

16. A non-transitory computer readable storage medium containing program instructions for displaying advertisement information on a physical display unit, wherein execution of the program instructions by one or more processors of a computer system causes the one or more processors to perform:

an acquisition process of acquiring advertisement information from an advertisement delivery apparatus;

a detection process of detecting a scroll state of a page displayed on the physical display unit;

when the page is not scrolling, a display control process of setting an initial display position of the advertisement information acquired in the acquisition process to a predetermined position of the page such that, if the predetermined position of the page is not included in a display area of the physical display unit, the advertisement information is not displayed;

when the page is scrolling, a display control process of setting the initial display position of the advertisement information acquired in the acquisition process to a display position of the physical display unit that is predetermined; and when scrolling of the page stops after the initial display position of the advertisement information has been set to the predetermined display position of the physical display unit, a change process of changing a display position of the advertisement information to the predetermined position of the page.

* * * * *